(12) United States Patent
Cho

(10) Patent No.: US 8,977,486 B2
(45) Date of Patent: Mar. 10, 2015

(54) NAVIGATION SYSTEM AND DISPLAYING METHOD THEREOF

(75) Inventor: Sung-Tae Cho, Kyoungki-do (KR)

(73) Assignee: Hyundai Motor Company, Seoul (KR)

( * ) Notice: Subject to any disclaimer, the term of this patent is extended or adjusted under 35 U.S.C. 154(b) by 252 days.

(21) Appl. No.: 13/431,145

(22) Filed: Mar. 27, 2012

(65) Prior Publication Data

US 2013/0124082 A1 May 16, 2013

(30) Foreign Application Priority Data

Nov. 15, 2011 (KR) ........................ 10-2011-0119207

(51) Int. Cl.
G01C 21/00 (2006.01)
G01C 21/30 (2006.01)
G01C 21/32 (2006.01)
G01C 21/36 (2006.01)
G08G 1/0969 (2006.01)

(52) U.S. Cl.
CPC .......... G01C 21/3638 (2013.01); G08G 1/0969 (2013.01)
USPC ........... 701/409; 701/431; 701/436; 701/437; 701/439; 701/457

(58) Field of Classification Search
USPC ......................................................... 701/409
See application file for complete search history.

(56) References Cited

U.S. PATENT DOCUMENTS

| | | | | |
|---|---|---|---|---|
| 4,109,235 A | * | 8/1978 | Bouthors | 340/461 |
| 5,294,940 A | * | 3/1994 | Wennagel et al. | 345/31 |
| 5,874,905 A | * | 2/1999 | Nanba et al. | 340/995.2 |
| 6,405,107 B1 | * | 6/2002 | Derman | 701/3 |
| 7,564,376 B2 | * | 7/2009 | Jang | 340/995.1 |
| 8,258,978 B2 | * | 9/2012 | Greasby | 340/901 |
| 8,346,426 B1 | * | 1/2013 | Szybalski et al. | 701/28 |
| 8,452,337 B2 | * | 5/2013 | Kim | 455/566 |
| 2007/0050110 A1 | * | 3/2007 | Kondoh et al. | 701/36 |
| 2008/0062167 A1 | * | 3/2008 | Boggs et al. | 345/419 |
| 2011/0109449 A1 | * | 5/2011 | Riegelman et al. | 340/441 |
| 2012/0054631 A1 | * | 3/2012 | Nurmi et al. | 715/744 |

FOREIGN PATENT DOCUMENTS

| | | |
|---|---|---|
| JP | 2002303521 A | 10/2002 |
| JP | 2004-177137 A | 6/2004 |
| JP | 2009-61871 A | 3/2009 |
| KR | 10-2008-0087484 | 10/2008 |
| KR | 10-2009-0129855 | 12/2009 |
| KR | 10-2010-0041543 | 4/2010 |
| KR | 10-2011-0015707 | 2/2011 |

* cited by examiner

*Primary Examiner* — Nicholas Kiswanto
(74) *Attorney, Agent, or Firm* — Edwards Wildman Palmer LLP; Peter F. Corless

(57) ABSTRACT

Disclosed is a navigation system and displaying method thereof, which controls the level of protrusion for each piece of indication data displayed on a 3-D screen of the navigation system based on its criticality so as to maximize the legibility of the driver. More specifically, the navigation system includes a GPS receiving member which receives GPS location information, a map data storage member which stores map data including a plurality of indication data, a controlling member which requests a display scope of the map data, corresponding to the received GPS location information, and at least one set of indication data within the display scope, and 3-D data-processes said indication data so that it can be displayed so that the most important data is protruding the most to the driver, and a display member which displays the map data containing the 3-D data-processed indication data.

4 Claims, 7 Drawing Sheets

PRIOR ART

PRIOR ART

NAVIGATION SYSTEM AND DISPLAYING METHOD THEREOF

CROSS-REFERENCE TO RELATED APPLICATION

The present application claims priority to Korean Patent Application No. 10-2011-0119207, filed on Nov. 15, 2011, the entire contents of which is incorporated herein for all purposes by this reference.

BACKGROUND OF THE INVENTION

1. Field of the Invention

The present invention relates to a navigation system and displaying method thereof, and more particularly, to a navigation system and displaying method thereof, which controls the level of protrusion for each indication data displayed on a 3-D screen of the navigation system by its criticality so as to maximize the legibility of the driver.

2. Description of Related Art

A navigation system, often called an automatic navigation system, is a system which provides on-road information to drivers using satellites. A navigation system is equipped with a GPS (Global Positioning System) receiver to receive GPS data from the GPS satellites orbiting the earth, and is able to locate a car in operation based on the GPS data it receives.

The navigation system is also equipped with a memory to store map data. Using the map data stored in a memory, the navigation system provides the users of a vehicle with a variety of services. For example, a navigation system may inform the user where the user's vehicle is on the map and guide the user to drive along the most optimal route to reach that destination, which it computed using the map data provided in the memory. Such navigation systems not only store regional information and information relating to points of interest (POI) showing the information associated with buildings and roads along with the map data and utilizes them to guide the user on the road, but also provide the user with various information such as the speed of the vehicle, whether the user is violating the speed regulations, and the information related to each intersection.

However, currently conventional system only display the map data in 3D and show other indication data in only 2D, which does not guarantee the legibility or understanding of a user. Therefore, a navigation system with the improved legibility for a user, which would still show the indication data or the alarm information in 3D while at the same time controlling the level of protrusion for the indication data according to the criticality of the indication data, is in required.

The information disclosed in this Background of the Invention section is only for enhancement of understanding of the general background of the invention and should not be taken as an acknowledgement or any form of suggestion that this information forms the prior art already known to a person skilled in the art.

SUMMARY OF THE INVENTION

The present invention was contrived to solve the problem of the prior art described above, and its objective is to provide a navigation system and displaying method thereof that enhances the driver's legibility in order to assist the driver in safe-driving and to improve driver convenience, by not only displaying the map data, but also the various indication data, differentiated according to their criticality on a 3D screen.

The technical problems that the present invention is set out to solve are not limited to the ones mentioned above, and those that are not mentioned shall be clearly understood by a person skilled in the art from looking at the specification of the present invention.

In accordance with one aspect of the present invention, a navigation system comprises a GPS receiving member which receives the GPS location information; a map data storage member which stores the map data including the multiple indication data; a controlling member which controls the display scope of the map data, corresponding to the received GPS location information, and at least one set of indication data within the display scope, and 3-D-data-processes the said indication data so that it can be displayed in a way that the most important data is most protruding to the driver; and a display member which displays the map data containing the 3-D data-processed indication data.

Preferably, the controlling member of the present invention comprises a criticality-deciding member for indication data, which decides the criticality level of each set of the indication data and saves the data accordingly; a requesting member for indication data, which requests at least one set of indication data that falls with the display scope of the map data that corresponds to the received GPS location information; and a 3D processing member which matches the requested indication data with a criticality level and determines how much the indication data will protrude in the direction of the driver.

Preferably, the indication data in the present invention includes the information related to the speed of the vehicle, the speed limit of the road the vehicle is on, the intersections, speeding radar, traffic cameras, traffic information collectors, POI's and bumps.

Preferably, in the present invention, the information related to the speed of the vehicle, which is a part of the indication data, is displayed in a way in which this data protrudes in the direction of where the driver is seated, in proportion to how much faster than the speed limit the vehicle is moving.

Preferably, in the present information, the information related the intersections, which are a part of the indication data, is displayed in a way that it protrudes in the direction of where the driver is seated, in reverse proportion to the distance to the intersection from the current location.

In accordance with another aspect of the present invention, a method of displaying a navigation system includes receiving the GPS location information, at the navigation system, according to the vehicle's movement; requesting at least one set of indication data that falls within the display scope of the map data that corresponds to the received GPS location information; 3-D data processing, by a processor, in which the controlling member matches the requested indication data with a criticality level and determines how much the indication data will protrude in the direction of the driver; and displaying the map data, on a display, which contains the 3-D processed indication data, to the driver.

Preferably, during 3-D data processing of the present invention, the controlling member processes the data so that the indication information protrudes in the direction of where the driver is seated, in proportion to how much faster than the speed limit the vehicle is moving.

Preferably, during 3-D data processing of the present invention, the controlling member processes the data so that the indication information protrudes in the direction of where the driver is seated, in reverse proportion to the distance to the intersection from the current location.

The present invention provides a non-transitory computer readable medium containing executable program instructions executed by a processor, controller or the like by which the above method may be performed through program instructions executed by the controlling member or a processor.

In accordance with a navigation system and displaying method thereof by the present invention, the legibility by a driver is maximized by differentiating the various indication data including the navigation's map data by its criticality and displaying it on a 3D screen. Also, the enhanced legibility on the navigation screen helps drivers increase driving safety, heighten driver satisfactory with the overall operation of the device, and increase driver convenience.

DETAILED DESCRIPTION

Reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereafter, with reference to the attached drawings, the preferred embodiment of the present invention will be described in detail. Before proceeding, it should be noted that the terminologies and words used on this specification and in the claims are not to be interpreted solely as the general or dictionary meanings, and they should be interpreted as the meanings and the concept which correspond with the technological ideas of the present invention based on the principle that the inventor can properly define the concept of the terminologies in order to explain his own invention in the best possible way. Therefore, the compositions described in the embodiments and the drawings of this specification are merely the most preferred types of embodiment and they do not represent the entire technological ideas of the present invention, and thus, it should be understood that there can be a variety of equivalents and alterations, which can replace these embodiments at the time of filing this application.

The present invention was designed to help the user make fewer misinterpretations of a navigational map on a navigation system and therefore the illustrative embodiment of the present invention help to reduce the risk of accidents by controlling the protrusion level of indication data such as danger information, route information or alert information on the 3D screen in the direction of the driver (Z-axis) so that the legibility of the driver is improved.

Figure 1:
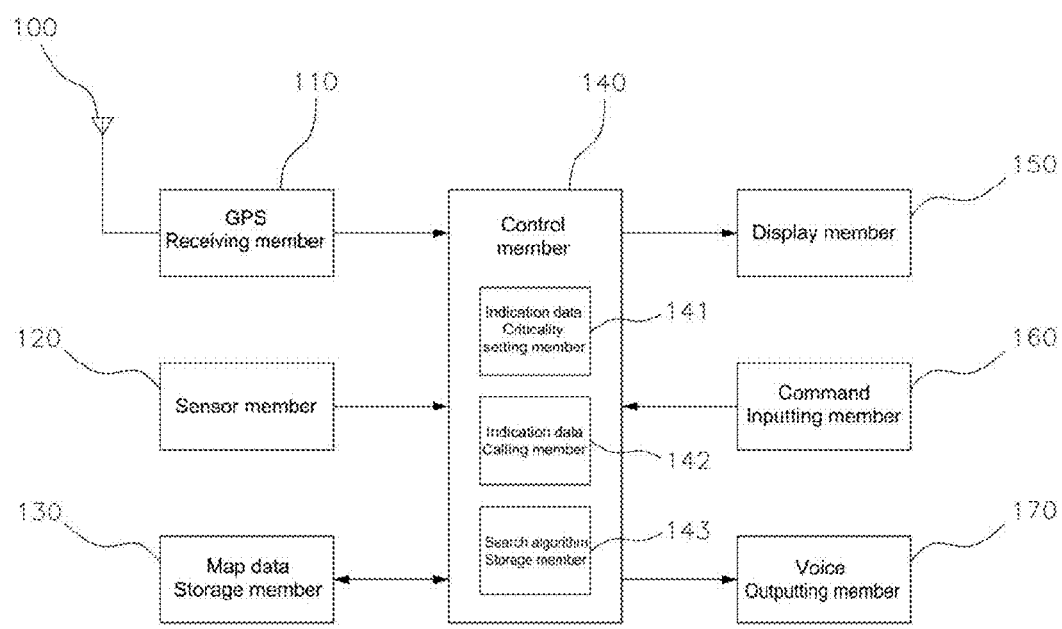
FIG. 1 is a schematic diagram of a navigation system according to an exemplary embodiment of the present invention.

FIG. 1 is a schematic diagram, of a navigation system according to an embodiment of the present invention. A navigation system based on the present invention comprises a GPS receiving member (110) which receives the GPS location information; a map data storage member (130) which stores the map data including the multiple indication data; a controlling member (140) which controls the display scope of the map data, corresponding to the received GPS location information, and at least one set of indication data within the display scope, and 3-D data-processes the said indication data so that it can be displayed in a way that the most important data is the most protruding information to the driver; and a display member (150) which displays the map data containing the 3-D data-processed indication data.

A GPS receiving member (110) uses the satellite signals received from multiple satellites via an antenna; calculates the positional value of the navigation system (or a vehicle in which a navigation system is installed); and conveys the positional value to the controlling member (140). More sensor members (120) can be installed in the present invention based upon need. The sensor member (120) comprises a gyro sensor, a speed sensor, etc. This sensor member senses the rotation, speed, etc. of a vehicle equipped with a navigation system and conveys the sensed value to the controlling member (140).

The map data storage member (130) can be a storage unit such as a hard disk drive (HDD), memory, flash drive, smart card, etc., and can store and supervise various map information to provide route searching and a navigation service and also the voice guidance information to provide multiple indication data for driving and the voice guidance. Such information is extracted if necessary and is provided to a controlling member.

The indication data mentioned above can include information regarding the speed of a vehicle, the speed limit of the road the vehicle is moving on, an intersection, speed camera, traffic information collector, POI (Point of Interest) and bumps. However, the indication data is not limited to the examples given above and should include any information necessary for driving such as the information of facilities nearby the route, skidding section, etc.

The present invention can be installed with one or more command inputting members (140), which comprise a touch screen and a key pad. In order to control the operation of a navigation system, the command inputting member (160) generates diverse operational data/requests, and the operation requests of the command inputting member (160) can be turned into output data, such as a route search, destination locating, or output of the search results, by the controlling member (140).

The controlling member (140) can be made up of a microprocessor, memory, etc., and controls the overall operation of a navigation system. In other words, the controlling member (140) maps the positional value of a navigation-system-installed vehicle, received from GPS receiving member (110), according to the various operational data, with the map data saved in the map data storage member (130); maps the sensed value including the rotation and speed, coming from the sensor member (120), with the map information data; controls the mapped navigation data so that it can be displayed on the display member (150); and sends the controlled signals to a voice outputting member (170) so that various alarm signals and voice guidance signals can be outputted through speakers.

Also, the controlling member (140) controls the display scope of the map data, corresponding to the received GPS location information, and at least one set of indication data within the display scope. The controlling member 140 utilizes the 3D data to process said indication data so that it can be displayed in a way that the most important data is the most protruding image on a display (e.g., screen) to the driver.

The controlling member (140) can be equipped with a indication data criticality setting member which sets the criticality of each of the indication data and saves it; an indication data requesting member (142) which requests at least one set of indication data within the display scope corresponding to the received GPS location information; and a 3-D data processing member (143) which is configured to match the requested indication data with the indication data's criticality level and decides the level of protrusion in the direction of the driver.

In other words, the level of criticality is set and saved in the indication data criticality setting member (141) either by the user, or by an engineer at the time of release of the vehicle, and when the vehicle is on the road, an indication data requesting member requests the indication data related to the map data corresponding to the GPS location information. A navigation system then matches the saved criticality level for each indication data with the requested indication data and displays it by controlling the level of protrusion in the direction of the driver (Z-axis).

Controlling the level of protrusion of the 3-D data should be one of the following: i) controlling the level of protrusion in the direction of where the driver is seated, in proportion to how much faster the vehicle is moving in comparison to the speed limit; ii) controlling the level of protrusion in the direction of where the driver is seated, in reverse proportion to the distance to the intersection; and iii) controlling the level of protrusion in a way which the size of the displayed intersection is larger for an intersection closer to the current location, among many intersections the vehicle will encounter on the way to the destination.

The voice outputting member (170) includes MPEG Codec and processes digital signals for voice signals. If voice guidance data is supplied to the voice outputting member (170) from the controlling member (140) when it is necessary while the navigation service is provided, the voice outputting member (170) processes the data and outputs it through speakers.

Figure 2:
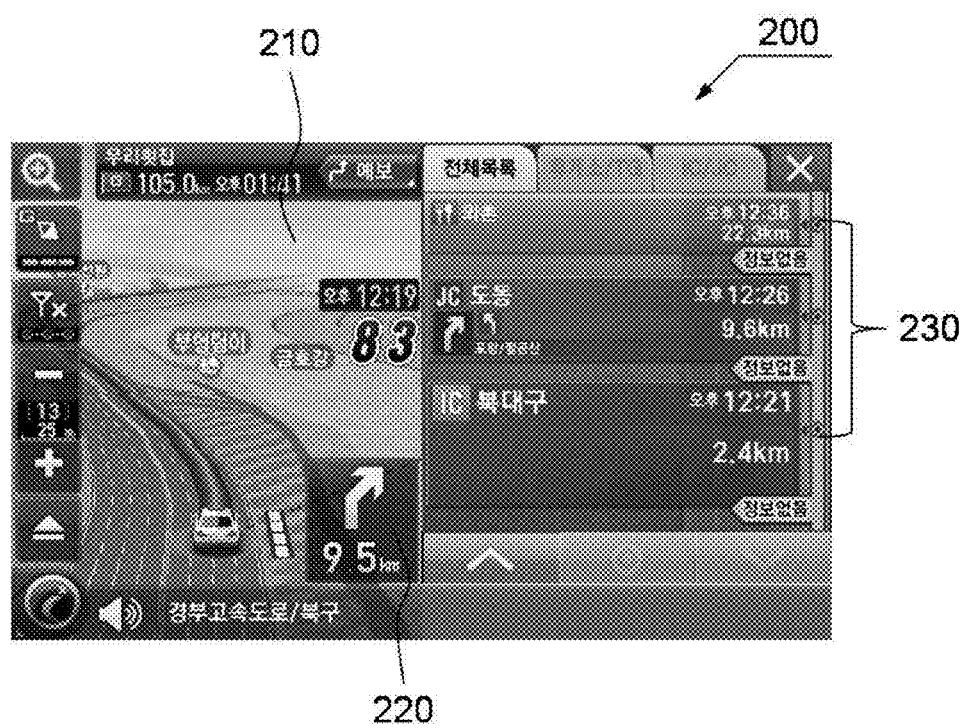
FIG. 2 is an embodiment of a screen displayed by a navigation system according to the prior art.

FIG. 2 is an embodiment of a screen displayed by a navigation system according to the prior art. In conventional process as shown in FIG. 2, perspective in relation to shapes of cars, status of the roads, topography of the vicinity, etc. is expressed on the display scope where the map data is displayed. However, indication data (220) and indication data regarding intersections of the roads (230) are simply processed in 2-D data and displayed on the screen as such. Drivers do not always interpret or see this information while they are driving.

Figure 3:
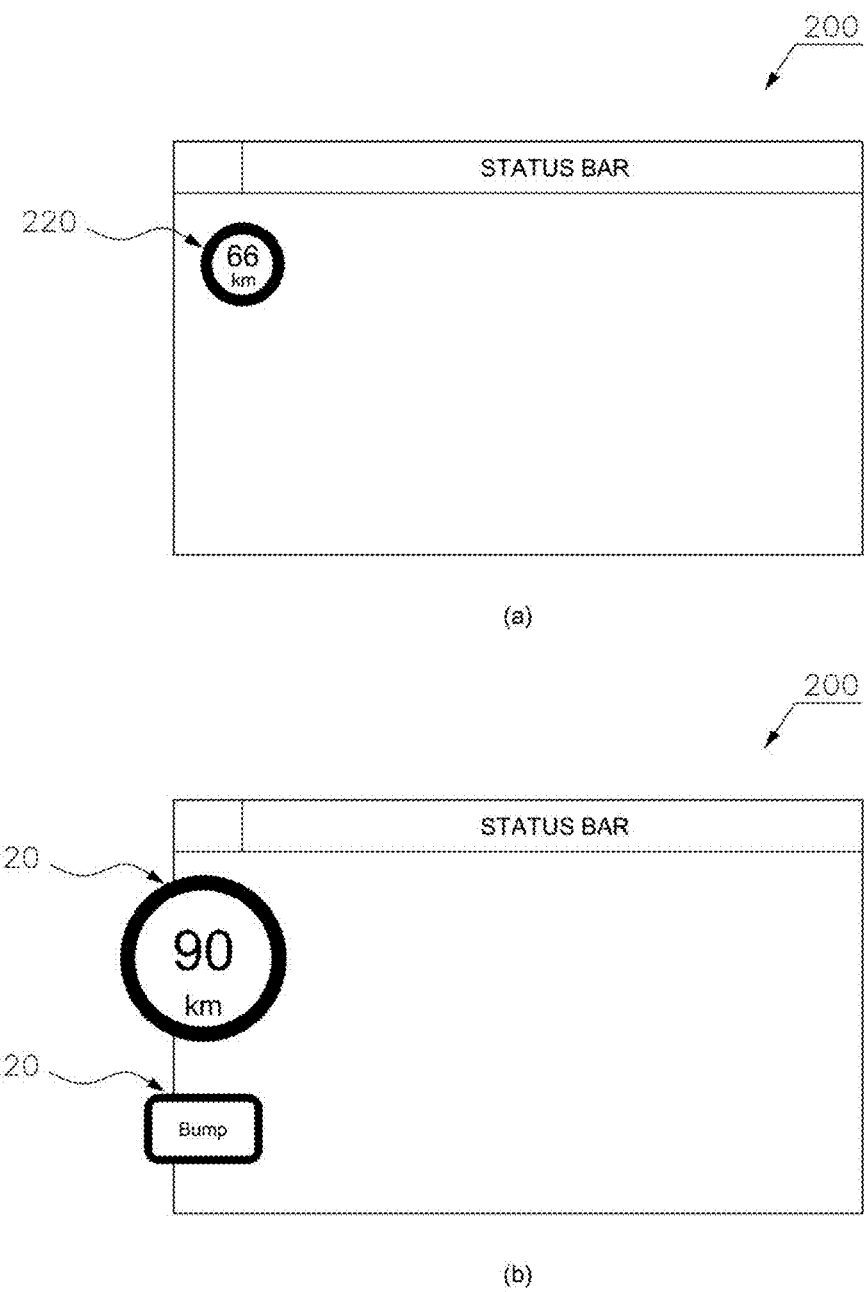
FIGS. 3A-B are embodiments of two respective screens displayed by a navigation system according to the prior art and an exemplary embodiment of the present invention.

FIGS. 3A-B are embodiments of two respective screens displayed by a navigation system according to the prior art and the present invention. According to the conventional process depicted in FIG. 3A, indication data (220) is processed in 2D and displayed on the display member (200), which makes it difficult to guarantee the legibility of a driver. However, according to the present invention, the indication data (220) is processed in 3-D data and displayed so that the more important a particular piece of data is, the more protruding to the driver it is, as can be seen in FIG. 3B. Therefore, it is easy to guarantee the legibility of according to the driver's perspective.

Figure 4:
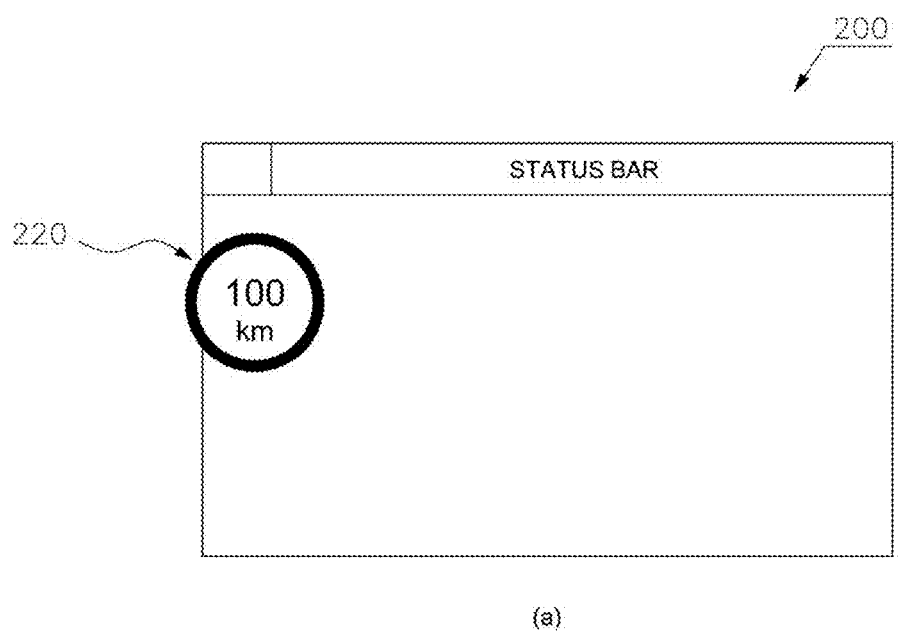
FIGS. 4A-B are embodiments of two screens displayed by a navigation system according to the exemplary embodiment of the present invention as the speed of the vehicle changes from one to another.
Figure 4:
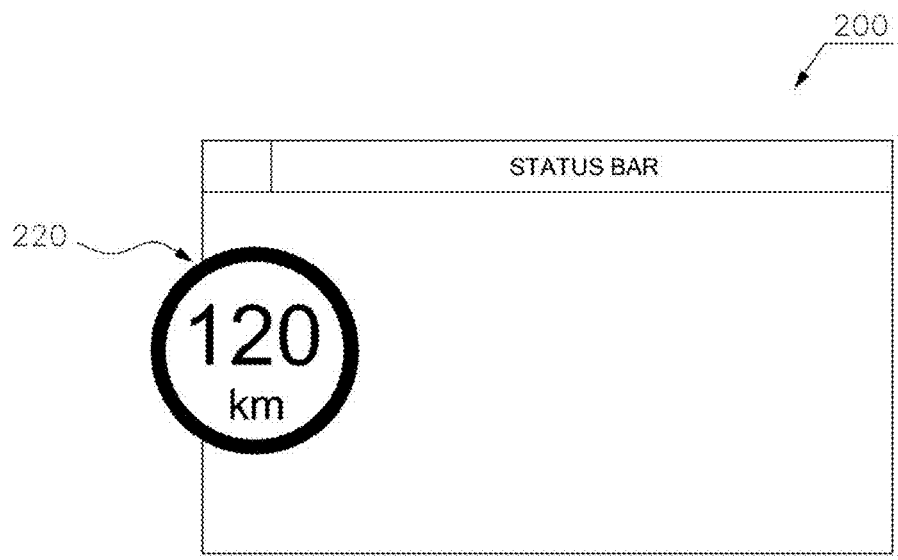

FIGS. 4A-B are embodiments of two screens displayed by a navigation system according to the present invention as the speed of the vehicle changes from one to another. For example, supposing that the speed limit of a road on which a car is moving is 100 km/hr, if a car equipped with a navigation system of the present invention is moving at a speed below 100 km/hr, the data will be displayed only minimally protruding towards the driver as can be seen in FIG. 4A.

On the other hand, if a car equipped with a navigation system of the present invention is moving at a speed greater than 100 km/hr, the data will be displayed at a greater protrusion level towards the driver as can be seen in FIG. 4B, and therefore, the legibility of a driver will be enhanced and the visual warning made possible, which will help a driver drive safely.

Figure 5:
FIG. 5 is an embodiment of two screens displayed by a navigation system according to the prior art.

FIG. 5 is an embodiment of two screens displayed by a navigation system according to the prior t art. As previously stated, according to the conventional process, the indication data containing the information to warn the driver of, or the indication data about the intersections (230) is processed simply in 2-D data and is displayed on a flat screen.

Figure 6:
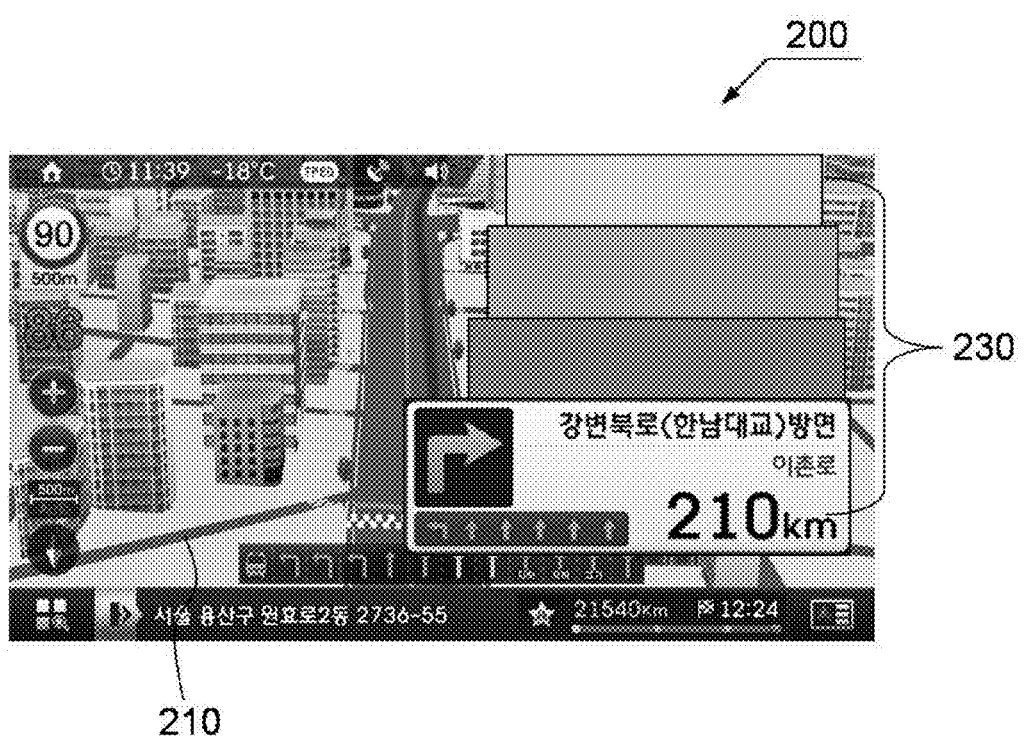
FIG. 6 is an embodiment of a screen displayed by a navigation system according to an exemplary of the present invention.

However, in case of the illustrative embodiment of the present invention, the level of protrusion is stronger for an intersection that is closer to the current location of the vehicle, among many intersections it will encounter on the way to the destination, and also at the same time, the size of the displayed intersection can be controlled as well. Hence the legibility of a driver can be maximized (see FIG. 6)

Figure 7:
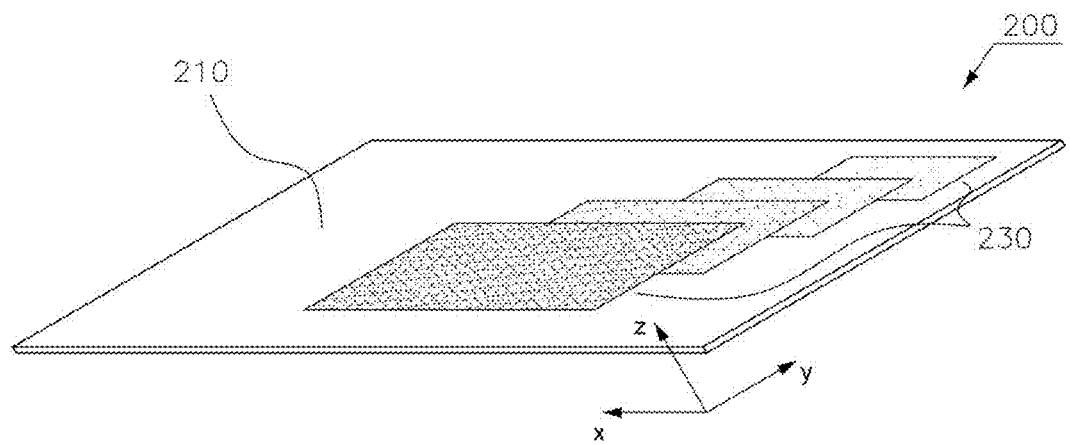
FIG. 7 is a perspective view of a screen displayed by a navigation system according to an exemplary of the present invention.

FIG. 7 is a perspective view of a screen displayed by a navigation system according to an example of the present invention. As depicted in FIG. 7, as the criticality of indication data is heightened, the data will be displayed with a greater level of protrusion ("virtually") in the direction of the Z-axis, and its size will be controlled as well, so the legibility of a driver can be guaranteed.

Figure 8:
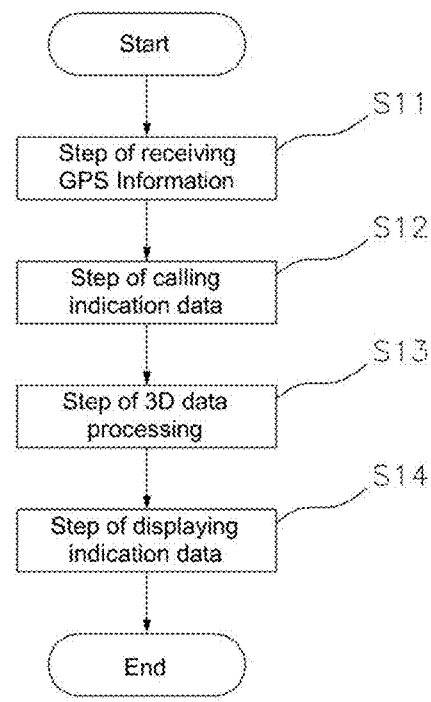
FIG. 8 is a flow chart of the displaying method of a navigation system according to an exemplary of the present invention.

FIG. 8 is a flow chart of the displaying method of a navigation system according to an example of the present invention. First, there is the step of receiving the GPS location information in accordance with the movement of a car (S11). Once the GPS location information is received, the controlling member requests at least one set of indication data, which matches with the display scope corresponding to the received GPS location information (S12). Here, the indication data can be information related to the speed of the vehicle, the speed limit of the road the vehicle is on, the intersection, the speeding radar, the traffic cameras, the traffic information collector, POI's and the bumps. Next, the controlling member 3-D-data-processes the requested indication data according to the matched criticality level in the direction of the driver (S13).

The criticality of the indication information can be pre-programmed by a user. For example, the level of 3-D protrusion for the indication of the speed of the car when it has passed the speed limit, or for intersections of the roads can be intensified. Thereafter, a display member receives map data, which includes the 3-D-data-processed indication data and displays it to the driver (S14).

The present invention 3-D-processes and displays a variety of warning information or indication data, and yet, the level of protrusion can be strengthened or weakened, so the legibility of a driver can be improved and the convenience of driving guaranteed.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications within the spirit of the invention and scope of the Claims to be defined below.

What is claimed is:

1. A navigation system comprising;
   a GPS receiving member configured to receive GPS location information;
   a map data storage member configured to store multiple indication data including map data;
   a controlling member configured to request a display scope of the map data, corresponding to the received GPS location information, and at least one set of indication data within the display scope, and further configured to 3-D data-process the indication data so that it can be displayed so that a most critical data is protruding the most to a driver;
   a display member configured to display the map data containing the 3-D data-processed indication data based on a criticality level of the indication data;
   an indication data criticality setting member configured to set and store the criticality level of each piece of indication data;
   an indication data requesting member configured to request at least one set of indication data that falls within the display scope of the map data that corresponds to the received GPS location information; and
   a 3-D-data-processing member configured to match the requested indication data with an indication data criticality level and determine a particular level of protrusion in a direction of the driver based on the criticality level of the indication data,
   wherein the indication data is selected from a group consisting of information related to a speed of a vehicle, a speed limit of a road the vehicle is on, intersections, speeding radar, traffic camera locations, traffic information collector locations, Points of Interest (POIs) and bump locations, and
   wherein the information related to the speed of the vehicle, which is a part of the indication data, is displayed so that the speed of the vehicle protrudes in a direction of where the driver is seated, in proportion to how much faster than the speed limit the vehicle is moving.

2. The system according to claim 1, wherein;
   the information of the intersections, which is a part of the indication data, is displayed so that the intersection information protrudes in the direction of where the driver is seated, in reverse proportion to the distance to the intersection from the current location.

3. The system according to claim 1, wherein;
   the size of the displayed intersection is larger for an intersection closer to the current location, among many intersections the vehicle will encounter on the way to the destination.

4. A display method of a navigation system comprising;
   receiving, by a GPS receiving member, GPS location information according to a vehicle's movement;
   requesting, by a controlling member, at least one set of indication data that falls within a display scope of map data that corresponds to the received GPS location information;
   3-D data processing the at least one set of indication data, by the controlling member, by matching the requested indication data with a criticality level and determining how much the indication data will protrude in a direction of a driver;
   3-D data processing the data so that the indication information protrudes in a direction of where the driver is seated, in proportion to how much faster than a speed limit the vehicle is moving;
   3-D data processing the data so that the indication data protrudes in a direction of where the driver is seated, in reverse proportion to a distance to a specific intersection among many intersections the vehicle will encounter on a route to a destination; and
   displaying the map data, which contains the 3-D processed indication data, to the driver based on the criticality level of the indication data,
   wherein the indication data selected from a group consisting of information related to a speed of the vehicle, a speed limit of a road the vehicle is on, the intersections, speeding radar, traffic camera locations, the traffic information collector locations, Points of Interest (POIs) and bump locations.

* * * * *